US010994666B1

(12) United States Patent
Bingle (10) Patent No.: US 10,994,666 B1
(45) Date of Patent: May 4, 2021

(54) VEHICLE BACKUP CAMERA ASSEMBLY

(71) Applicant: ADAC Plastics, Inc., Grand Rapids, MI (US)

(72) Inventor: Rob Bingle, Walker, MI (US)

(73) Assignee: ADAC Plastics, Inc., Grand Rapids, MI (US)

(*) Notice: Subject to any disclaimer, the term of this patent is extended or adjusted under 35 U.S.C. 154(b) by 778 days.

(21) Appl. No.: 14/144,441

(22) Filed: Dec. 30, 2013

Related U.S. Application Data (60) Provisional application No. 61/747,944, filed on Dec. 31, 2012.

(51) Int. Cl.
| | |
|---|---|
| *B60Q 1/24* | (2006.01) |
| *B60R 11/04* | (2006.01) |
| *E05B 17/10* | (2006.01) |
| *B60Q 1/32* | (2006.01) |

(52) U.S. Cl.
CPC .............. *B60R 11/04* (2013.01); *B60Q 1/323* (2013.01); *E05B 17/10* (2013.01)

(58) Field of Classification Search
CPC ........ B60R 11/04; B60Q 1/2665; B60Q 1/323
USPC ....................................................... 348/143
See application file for complete search history.

(56) References Cited

U.S. PATENT DOCUMENTS

| | | | | | |
|---|---|---|---|---|---|
| 4,069,490 | A * | 1/1978 | Graham | ................ | G03B 17/52 396/37 |
| 4,896,136 | A * | 1/1990 | Hotovy | ................ | B60Q 1/302 340/468 |
| 6,186,653 | B1 * | 2/2001 | Tyves | ................ | B60Q 3/51 362/457 |
| 6,402,354 | B1 * | 6/2002 | Tatewaki | ................ | B60Q 3/74 362/234 |
| 6,542,071 | B1 * | 4/2003 | Ohtsubo | ............. | B60R 25/2036 340/10.1 |
| 7,576,631 | B1 * | 8/2009 | Bingle | ................ | E05B 81/76 340/5.54 |
| 7,984,938 | B2 * | 7/2011 | Tanimoto | ................ | E05B 81/78 292/336.3 |
| 8,131,429 | B2 * | 3/2012 | Plaster | ................ | B60R 25/102 701/45 |
| 8,830,317 | B2 * | 9/2014 | Meier | ................ | B60R 11/04 348/143 |
| 8,963,701 | B2 * | 2/2015 | Rodriguez Barros | . | B60Q 1/323 340/438 |
| 2003/0053317 | A1 * | 3/2003 | Mertens | ................ | B60Q 1/302 362/487 |
| 2009/0273941 | A1 * | 11/2009 | Englander | ............. | B60Q 1/323 362/464 |
| 2011/0227712 | A1 * | 9/2011 | Atteck | ................ | B60R 25/10 340/429 |
| 2012/0020099 | A1 * | 1/2012 | Bingle | ................ | B60Q 1/2665 362/464 |
| 2012/0020100 | A1 * | 1/2012 | Bingle | ................ | B60Q 1/2665 362/494 |
| 2012/0039082 | A1 * | 2/2012 | Rodriguez Barros | ................ | B60Q 1/2665 362/494 |
| 2013/0130674 | A1 * | 5/2013 | De Wind | ............. | B60Q 1/2619 455/420 |

(Continued)

*Primary Examiner* — Luis Perez-Fuentes
(74) *Attorney, Agent, or Firm* — Barnes & Thornburg LLP (57) ABSTRACT

An assembly for a vehicle door, the assembly including a housing containing a back-up camera and at least one of an exterior light and a manually operable release operative to effect the opening of the vehicle door.

13 Claims, 8 Drawing Sheets

(56) References Cited

U.S. PATENT DOCUMENTS

2014/0168437 A1* 6/2014 Rother ................... B60R 11/04
348/148

* cited by examiner

VEHICLE BACKUP CAMERA ASSEMBLY

CROSS-REFERENCE TO RELATED APPLICATIONS

The present regular utility patent application is related to, and claims the benefit of priority from, U.S. Provisional Patent Application Ser. No. 61/747,944, filed 31 Dec. 2012, the disclosure of which is incorporated herein by reference in its entirety.

FIELD OF THE INVENTION

The invention relates to vehicle back-up cameras and, more particularly, to an assembly for a vehicle door, such as a tailgate, trunk, etc., the assembly comprising a housing containing a backup camera and at least one of an exterior light and a manually operable release operative to effect the opening of the vehicle door.

BACKGROUND OF THE INVENTION

Some vehicles, and more particularly automobiles, include a camera positioned on or proximate the rear of the vehicle in order to provide images of the environment immediately behind the vehicle to a monitor positioned within the vehicle in view of the driver. The images seen by the driver are horizontally flipped from those taken by the backup camera so as to make the images orientation consistent with the images the driver sees in the rearview and side-view mirrors.

These cameras, commonly referred to as "backup cameras," are becoming more and more prevalent as they greatly aid safely driving the vehicle in reverse. Indeed, the National Highways Transportation and Safety Administration is calling for regulations to make backup cameras a mandatory feature in all automobiles sold in the United States beginning in 2014.

Conventionally, backup cameras are discretely and unobtrusively positioned on or adjacent the rear of the vehicle where they provide a good view of the environment immediately behind the vehicle. Typically, this is on or near a trim component provided across at least part of the rear of a vehicle's trunk or tailgate.

SUMMARY OF THE DISCLOSURE

Disclosed herein is an assembly for a vehicle door, the assembly comprising a housing containing a back-up camera and at least one of an exterior light and a manually operable release operative to effect the opening of the vehicle door.

Per one feature, the exterior light comprises at least one LED.

The manually operable release may, in one embodiment, comprise a circuit board including a capacitive sensor and a switch, the switch operable to effect opening of the vehicle door when the capacitive sensor detects the presence of a user's hand. The circuit board may be a flexible circuit board. Per this embodiment, the at least one exterior light may comprise an LED positioned on the circuit board.

The manually operable release may, in another embodiment, comprise a handle operably connectable to a latch mechanism to effect opening of the vehicle door.

Per another feature of the present invention, the housing contains both at least one exterior light and at least a light-transmissive lens portion through which the at least one exterior light is capable of transmitting light.

In one embodiment, the housing contains each of a back-up camera, at least one exterior light, and a manually operable release operative to effect the opening of the vehicle door.

In another embodiment, the vehicle door assembly comprises at least a partial section of the vehicle door, the at least partial vehicle door section including a housing containing a back-up camera and at least one of an exterior light and a manually operable release operative to effect the opening of the vehicle door. The at least partial section of the vehicle door may, in one version, define a section of the vehicle door proximate the rear license plate holder, with the at least one exterior light oriented to illuminate the rear license plate.

BRIEF DESCRIPTION OF THE DRAWINGS

The foregoing and other features and advantages of the present invention may be better understood with reference to the specification and accompanying drawings, of which.

DETAILED DESCRIPTION

Referring now to the drawings, wherein like numerals indicate like or corresponding parts throughout the several views, there is disclosed in a first embodiment (FIGS. 1 through 7) an assembly 10 for a vehicle door, the assembly 10 comprising a housing 15 (see FIGS. 4 and 5) containing a backup camera 20 (see FIGS. 4 and 5) and at least one of an exterior light 30 for illuminating a license plate, providing ground illumination, etc. (see FIGS. 6 and 7), and a manually operable release operative to effect the opening of the vehicle door.

According to the illustrated example, the assembly 10 is a self-contained structure secured to at least a partial section 50 of a vehicle door (not depicted in its entirety). The partial door section 50 as shown for exemplary purposes defines a section of the vehicle door proximate the rear license plate holder (illustrated, for purposes of orientation, at 60, showing the dimensions of an American-style license plate, and 65, showing the dimensions of a European-style license plate). Further according to the illustrated embodiment, the assembly 10 is secured to the partial door section 50 proximate the vehicle's fore and aft centerline, this orientation serving not only to position the assembly 10 so as to be able to adequately illuminate the vehicle's license plate (e.g., 60, 65), but also to be able to maximize the rearward field of view of the camera 20. It may also be seen from the drawings that, in the orientation depicted, the camera 20 is oriented to face slightly downward toward the base of the vehicle. However, it will be understood that while the foregoing exemplifies one orientation thereof, alternative placements of the assembly 10 are possible.

Referring particularly to FIGS. 4 through 7, housing 15 is generally comprised of two components in the illustrated embodiment: A first, opaque component 15a; and a second, at least partially light-transmissive, component 15b. These components 15a, 15b may comprise separately formed elements which are subsequently connected in conventional fashion to define the unitary housing 15 or, alternatively, they may be fashioned as a single, monolithic element combining both components 15a, 15b. If fashioned as a single element, the light-transmissive portion 15b may, for instance, be defined by windows formed either as separate elements secured to the housing 15 or, alternatively, the housing 15 may be fashioned from a light-transmissive material over a portion of which is defined (such as, for instance, by painting) as mask to define the opaque portions.

Housing 15 may be fashioned from any suitable material or materials, including, for instance, polymers (e.g., ABS plastic), metal, or combinations thereof.

Figures 6, 7:
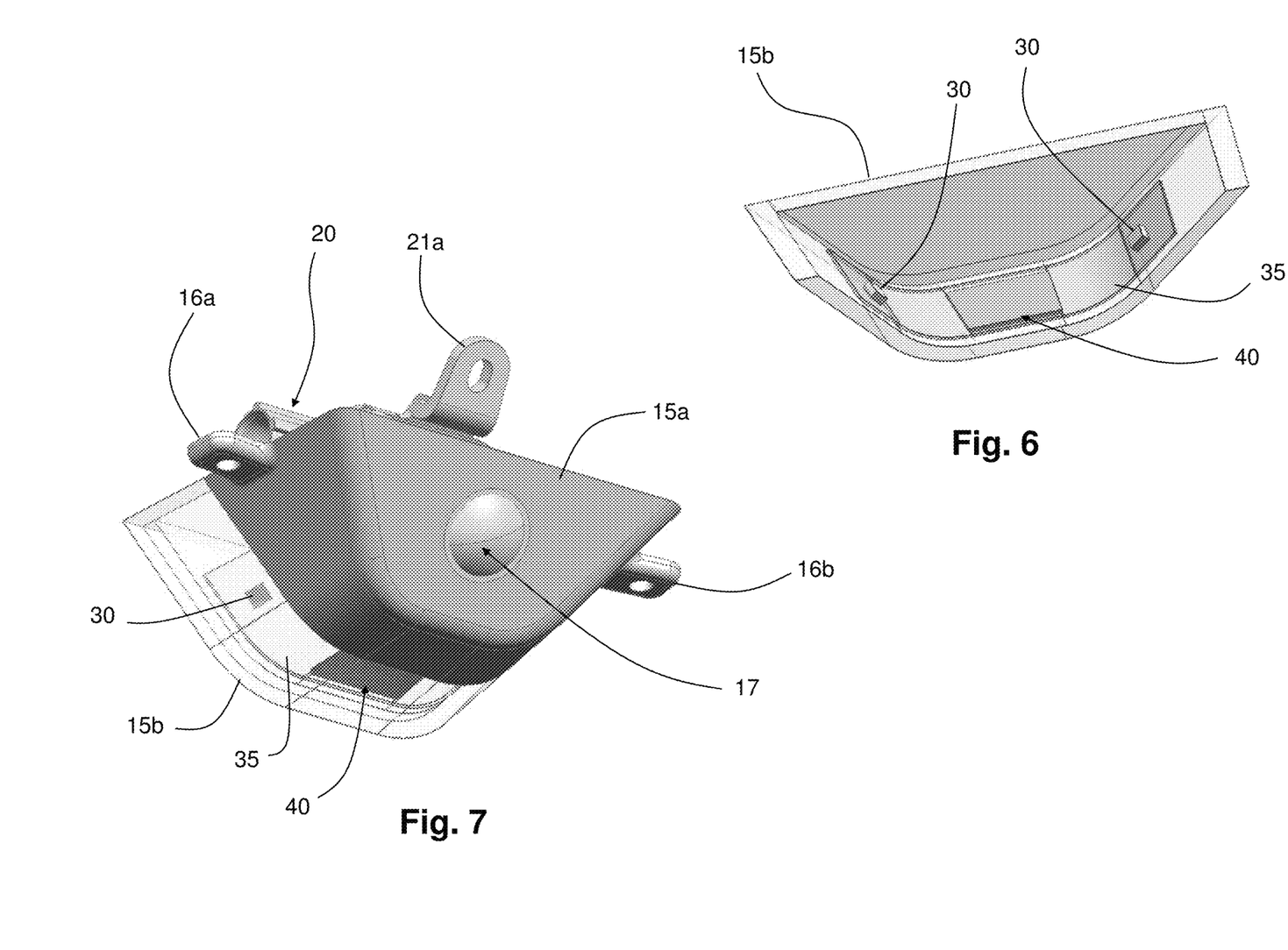
FIG. 6 is a detailed perspective view of a portion of the vehicle backup camera assembly of FIG. 1.
FIG. 7 is a perspective view of the vehicle backup camera assembly of FIG. 1.
Figure 8:
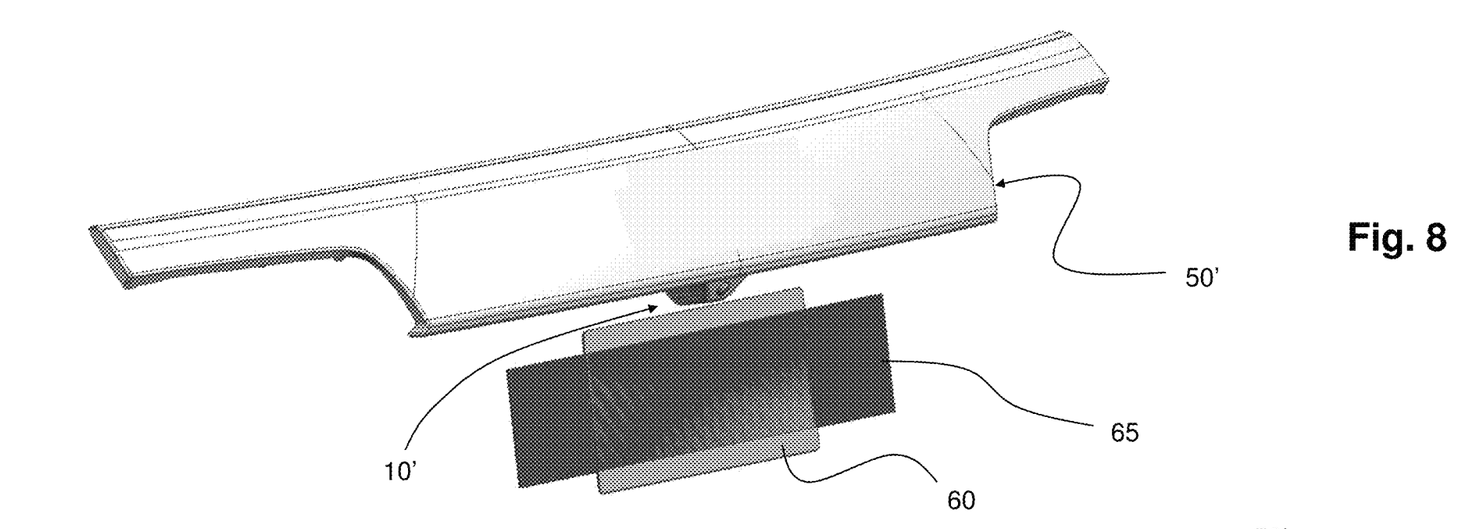
FIG. 8 is quartering perspective view showing the vehicle backup camera assembly according to a second embodiment, wherein at least a portion of the housing is included in the vehicle structural panel.
Figure 9:
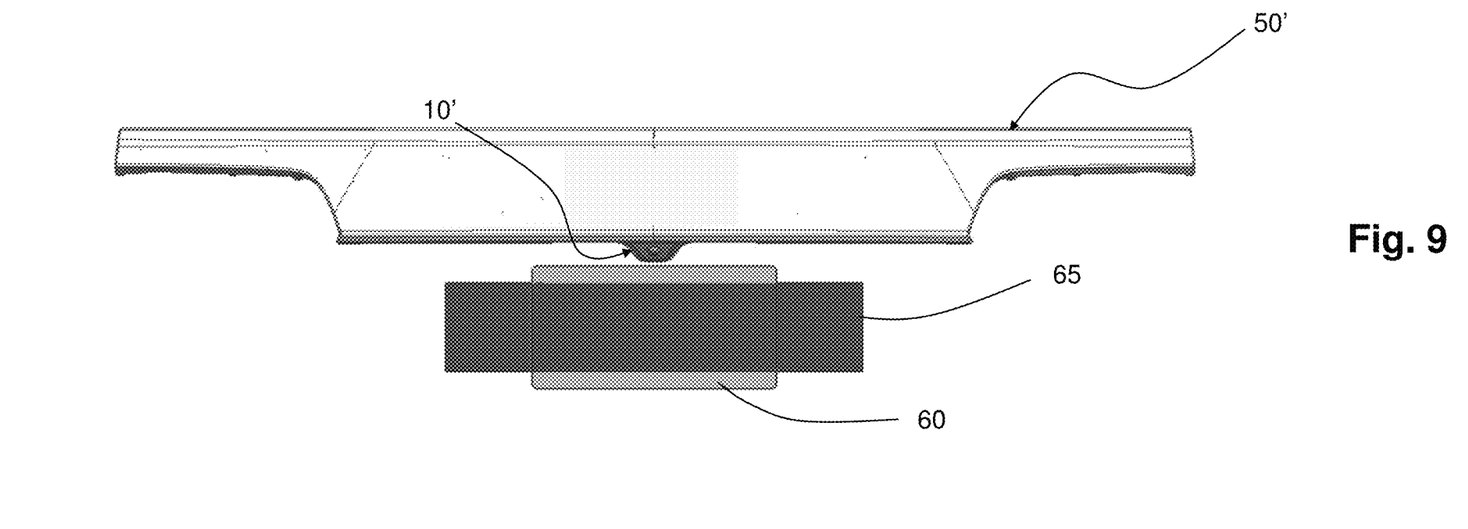
FIG. 9 is a frontal view of the vehicle backup camera assembly of FIG. 8.

Housing 15 includes one or more tabs 16a and 16b, each defining an opening therethrough, as shown, for receiving a fastener so that the housing can be secured to the partial door section 50 (not shown in FIGS. 6 and 7). However, these particular securement means are only exemplary of one exemplary form for attaching the housing 15 to the vehicle, and so are not intended to be limiting of the present invention.

An opening or window 17 is provided in the housing and, more specifically according to the illustrated embodiment, in the opaque component 15a. This opening or window 17 is aligned with the lens of camera 20 in the assembled state of the invention so that the camera 20 can function to capture images from the environment immediately behind the vehicle.

Camera 20 is of conventional construction and, as depicted, includes means (such as the illustrated tabs 21a, 21b) permitting its securement, such as via fasteners, to the partial door section 50 (via tab 21a) and to the housing 15 (via tab 21b).

Figure 1:
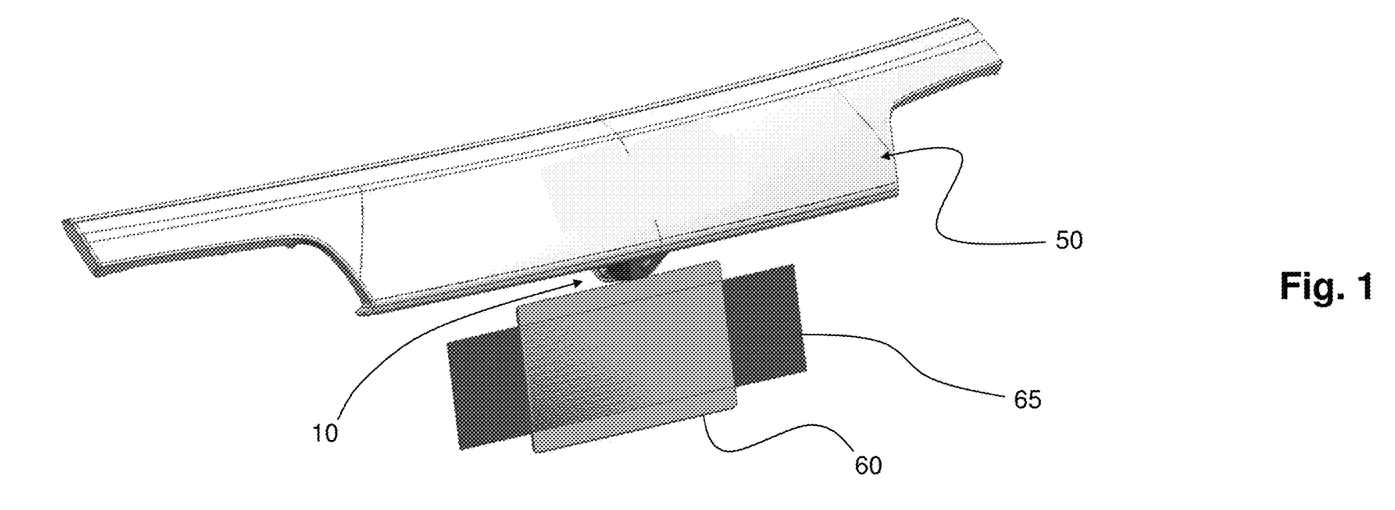
FIG. 1 is quartering perspective view showing the vehicle backup camera assembly according to a first embodiment and in an exemplary vehicle structural panel.
Figure 2:
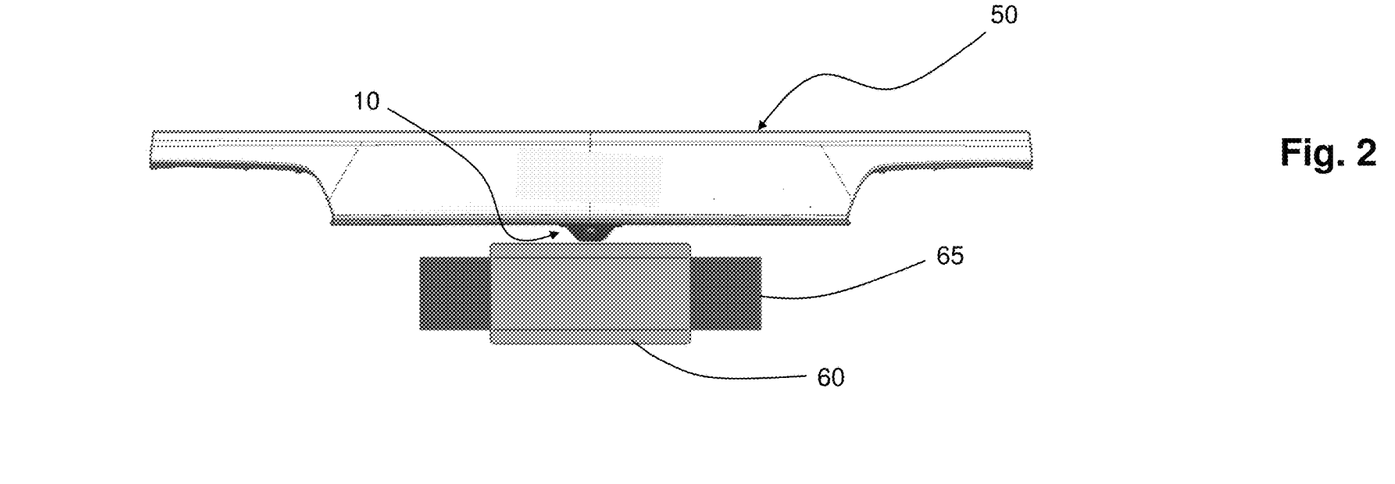
FIG. 2 is a frontal view of the vehicle backup camera assembly of FIG. 1.
Figure 3:
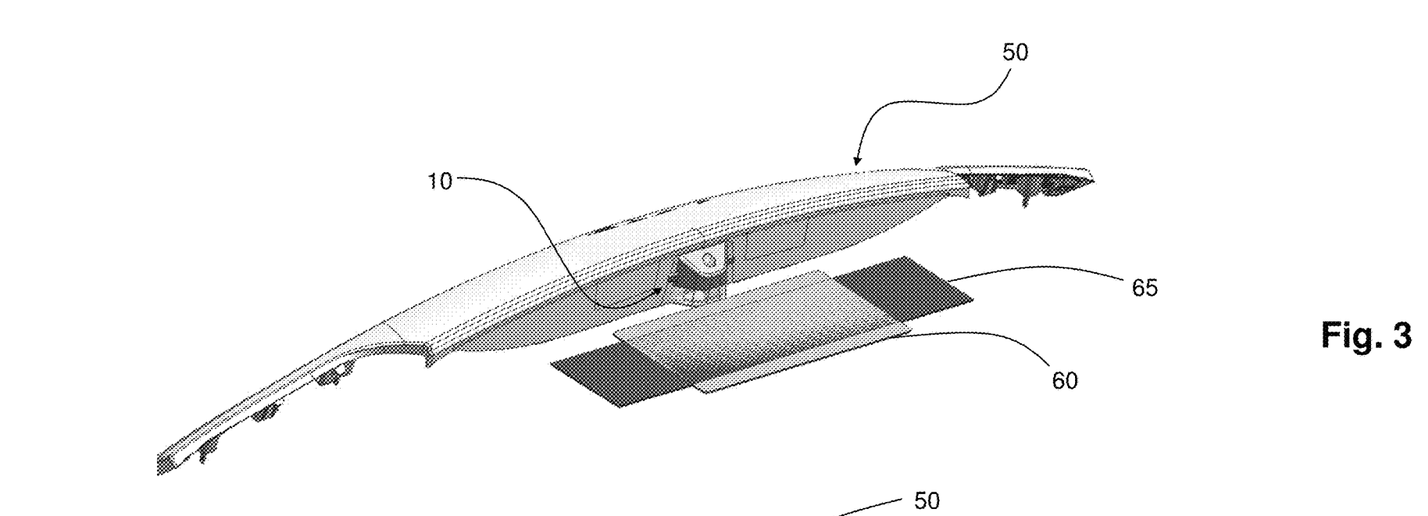
FIG. 3 is a further perspective view of the vehicle backup camera assembly of FIG. 1.
Figure 4:
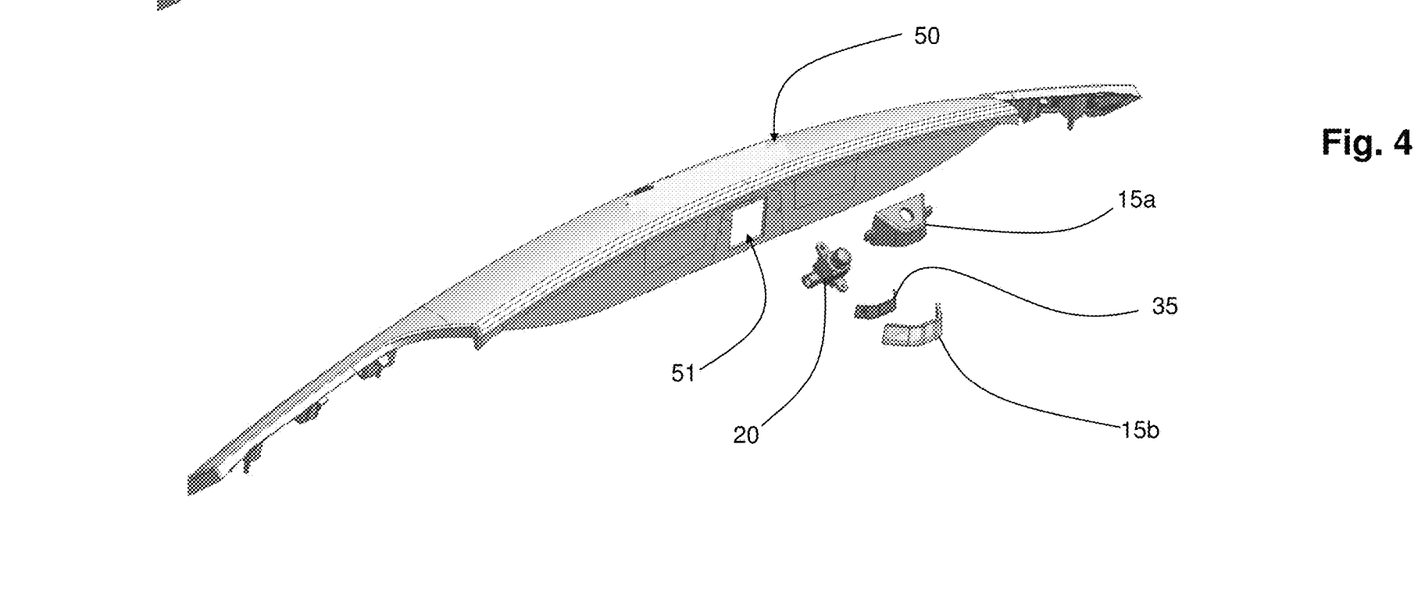
FIG. 4 is an exploded perspective view of the vehicle backup camera assembly of FIG. 1.
Figure 5:
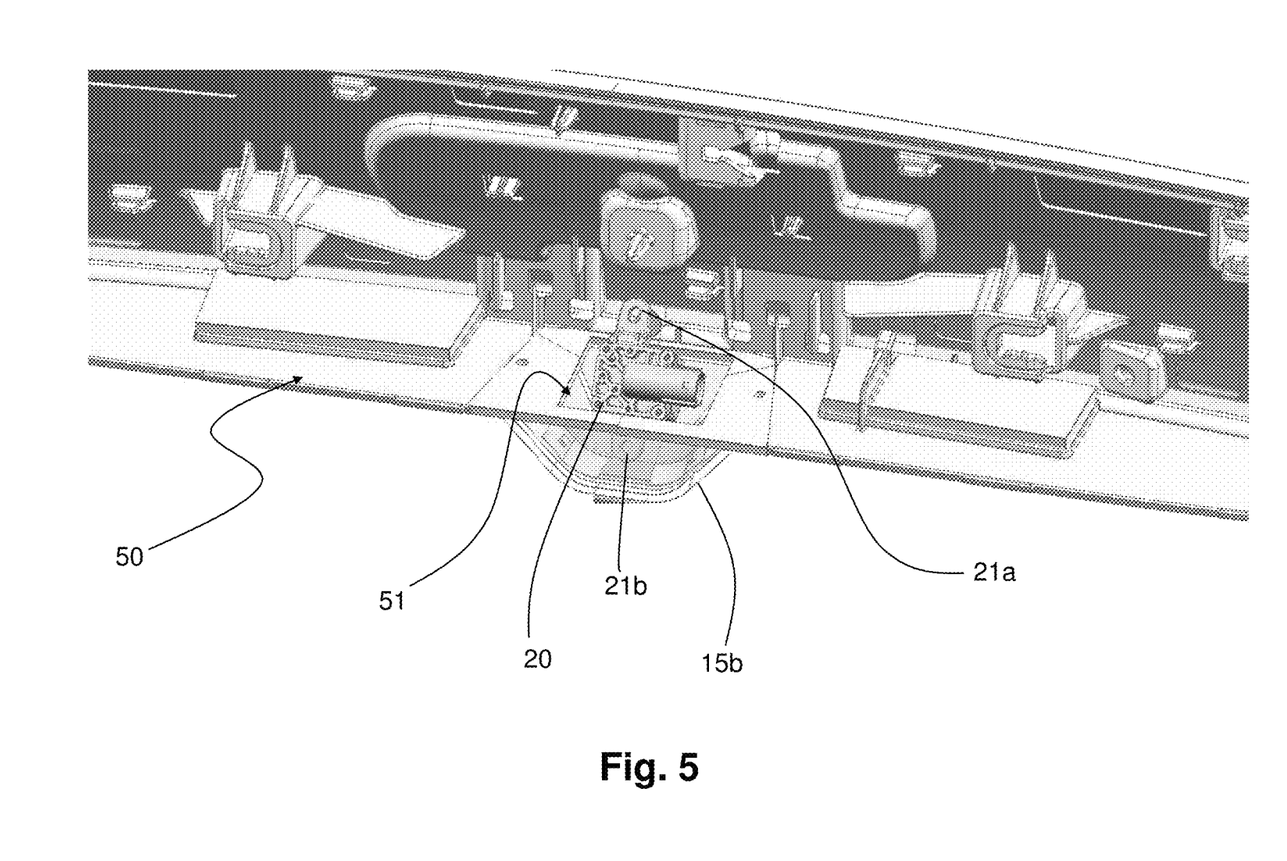
FIG. 5 is a rear view of the vehicle backup camera assembly of FIG. 1.

As shown best in FIGS. 4 and 5, partial door section 50 includes an opening 51 therethrough, the opening 51 positioned proximate the mounting location of the assembly 10. As will be appreciated, this opening 51 permits a portion of the camera 20 to extend therefrom behind the partial door section 50 (as shown best in FIG. 5) and, moreover, facilitates the passage of wires, cables or other hook-ups between the vehicle and the camera 20, as well as other components of the assembly 10 (described in more detail below).

With continued reference to FIGS. 4 and 5, the manually operable release may, as depicted, comprise a circuit board 35 including a capacitive sensor and a switch (generally depicted at 40), the switch operable to effect opening of the vehicle door (via the door's electromechanical opening mechanism) when the capacitive sensor detects the presence of a user's hand in proximity thereto. Such sensors and switches are, generally speaking, conventional, though there particularly application to a device such as that instantly disclosed is believed to be heretofore unknown.

The circuit board 35 may be a conventional, flexible circuit board, as depicted, or a rigid, printed circuit board of more typical construction.

Alternatively, the manually operable release may, in another embodiment, comprise a conventional mechanical handle assembly operably connectable to a latch mechanism to effect opening of the vehicle door. Such mechanical handle assemblies are known.

The at least one exterior light 30 may comprise any type of light, including one or more LEDs, OLEDs, etc. In the illustrated embodiment, the at least one light 30 comprises at least a pair of LEDs, each positioned on the circuit board 35 so as to be activated (i.e., selectively illuminated or not) and powered thereby in conventional fashion (such as, for instance, when a user unlocks the vehicle via a key fob remote, activates exterior vehicle lighting via a key fob remote, etc.).

Turning next to FIGS. 8 through 13, there is depicted another embodiment of the invention according to which the vehicle door assembly 10' also comprises at least a partial section 50' of the vehicle door, the at least partial vehicle door section 50' including a housing containing a back-up camera 20' and at least one of an exterior light 30' and a manually operable release operative to effect the opening of the vehicle door (actuatable via a sensor 40' as heretofore described). As with the embodiment of FIGS. 1 through 7, the at least partial section 50' of the vehicle door may, as illustrated, define a section of the vehicle door proximate the rear license plate holder, with the at least one exterior light 30' oriented to illuminate one or more of the rear license plate, the ground proximate the rear of the vehicle, etc. This alternative embodiment is, except as identified hereinbelow, in all material respects essentially the same as the embodiment described first above. More particularly, the embodiment of FIGS. 8 through 13 is distinguished in that the housing 15' is at least partially formed monolithically with the door section 50.

Figures 10, 11:
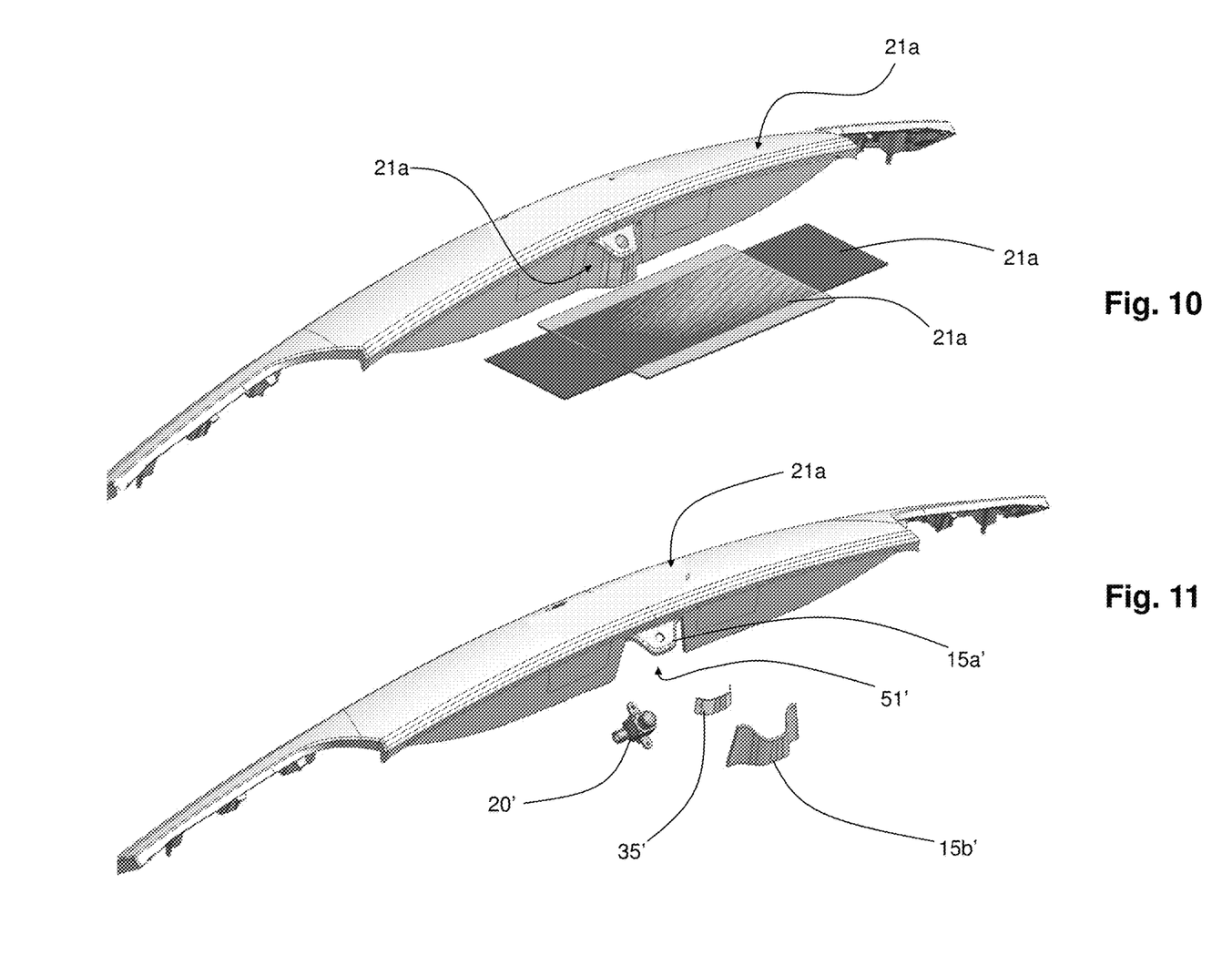
FIG. 10 is a further perspective view of the vehicle backup camera assembly of FIG. 8.
FIG. 11 is an exploded perspective view of the vehicle backup camera assembly of FIG. 8.
Figure 12:
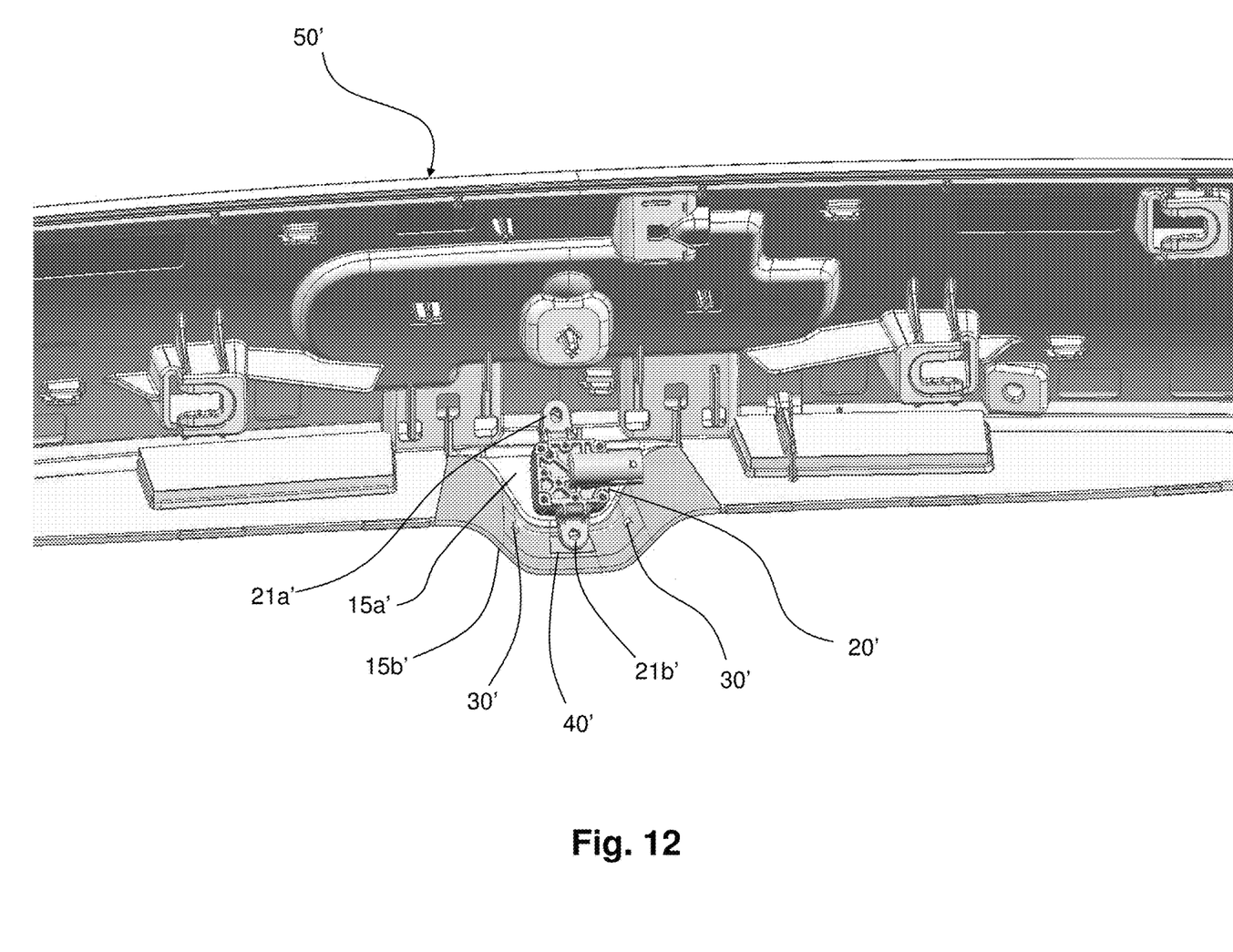
FIG. 12 is a rear view of the vehicle backup camera assembly of FIG. 8.
Figure 13:
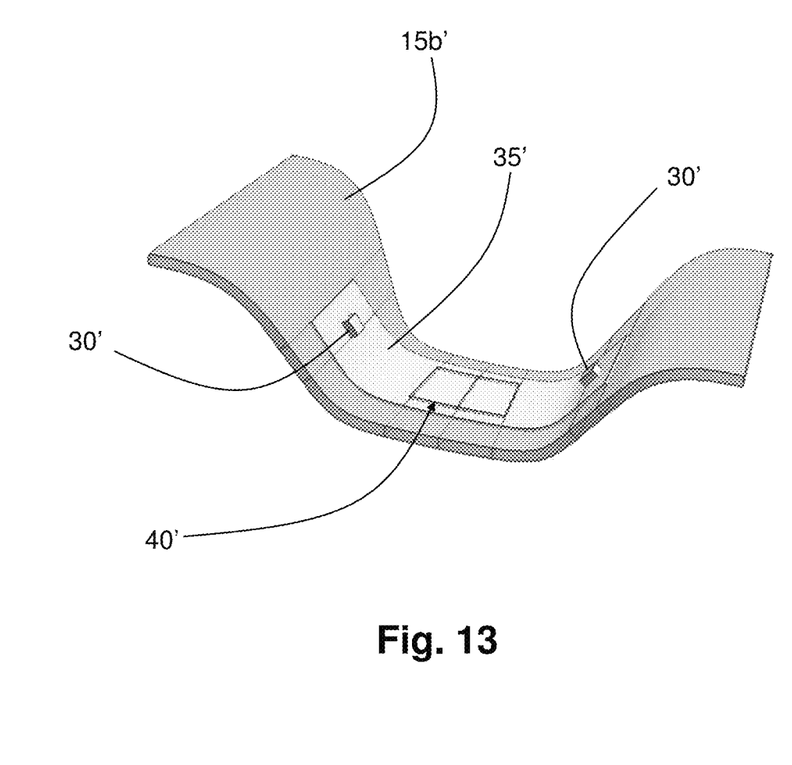
FIG. 13 is a detailed perspective view of a portion of the vehicle backup camera assembly of FIG. 8.

As shown best in FIGS. 11 through 13, the housing 15' comprises a first, opaque component 15a' and a second, at least partially light-transmissive component 15b'. Opaque component 15a' is formed monolithically with the door section 50', or at least a portion thereof, and positioned proximate the opening 51' (through which the camera 20' extends, as described heretofore in connection with the embodiment of FIGS. 1 through 8). An opening or window 17' through the opaque portion 15a' is aligned with the lens of camera 20' in the assembled state of the invention so that the camera 20' can function to capture images from the environment immediately behind the vehicle.

To the opaque portion 15a' of the housing 15' is affixed the at least partially transparent portion 15b' so as to span the opening 51' (as best shown in FIGS. 11 and 13) through the door section 50'.

Camera 20' includes means (such as the illustrated tabs 21a', 21b') permitting its securement, such as via fasteners, to the partial door section 50' (via tab 21a') and to the housing 15' (via tab 21b').

Optionally, the housing 15' may be fashioned as a single element, monolithically formed with the door section 50' (or some portion thereof). According to this embodiment, it will be appreciated that the light-transmissive portion 15b' may, for instance, be defined by windows formed either as separate elements secured to the housing 15' or, alternatively, the housing 15′ may be fashioned from a light-transmissive material over a portion of which is defined (such as, for instance, by painting) as mask to define the opaque portions.

Many modifications and variations of the present disclosure, all of which will be apparent to those skilled in the art having the benefit of this disclosure, are possible in light of the above teachings. Therefore, within the scope of the appended claims, the present disclosure may be practiced other than as specifically described.

The invention in which an exclusive property or privilege is claimed is defined as follows:

1. An assembly for a vehicle door, the assembly comprising:
    a housing containing a back-up camera, a manually operable release actuatable by a user to effect opening of the vehicle door, and two lights for providing illumination outside of the housing;
    wherein the housing is adapted to be mounted to the vehicle door and comprises an opening or window therein through which a lens of the back-up camera is exposed to the exterior of the housing;
    wherein further the two lights are disposed in an area of the housing that is positioned closer to the vehicle door than the back-up camera lens opening or window, and the manually operable release is positioned in the housing between the two lights.

2. The assembly of claim 1, wherein the two lights each comprise at least one LED.

3. The assembly of claim 2, wherein the manually operable release comprises a circuit board including a capacitive sensor and a switch, the switch operable to effect the opening of the vehicle door upon detection by the capacitive sensor of the presence of a user's hand in proximity thereto.

4. The assembly of claim 3, wherein each at least one LED is positioned on the circuit board.

5. The assembly of claim 3, wherein the circuit board is a flexible circuit board.

6. The assembly of claim 1, wherein the area of the housing in which the two lights are disposed comprises a light-transmissive lens through which light emitted by the two lights is transmitted.

7. An assembly for a vehicle door, the assembly comprising:
    a housing containing a back-up camera, a manually operable release actuatable by a user to effect opening of the vehicle door, and two lights, the housing comprising a first housing component formed monolithically with a partial section of the vehicle door and a second housing component affixed to the first housing component, the second housing component at least partially light-transmissive;
    wherein the first housing component comprises an opening or window therein through which a lens of the back-up camera is exposed to the exterior of the housing;
    wherein further the two lights are disposed in the second housing component and positioned closer to the vehicle door than the back-up camera lens opening or window, and the manually operable release is positioned between the two lights.

8. The assembly of claim 7, wherein the two lights each comprise at least one LED.

9. The assembly of claim 8, wherein the manually operable release comprises a circuit board including a capacitive sensor and a switch, the switch operable to effect the opening of the vehicle door upon detection by the capacitive sensor of the presence of a user's hand in proximity thereto.

10. The assembly of claim 9, wherein each at least one LED is positioned on the circuit board.

11. The assembly of claim 9, wherein the circuit board is a flexible circuit board.

12. The assembly of claim 7, wherein the area of the second housing component in which the two lights are disposed comprises a light-transmissive lens through which light emitted by the two lights is transmitted.

13. The assembly of claim 7, wherein the at least partial section of the vehicle door defines a section of the vehicle door proximate the rear license plate holder, and the two lights are oriented to illuminate the rear license plate.

\* \* \* \* \*